United States Patent
Schwalm et al.

(10) Patent No.: US 6,444,721 B2
(45) Date of Patent: Sep. 3, 2002

(54) WEATHERING-STABLE, RADIATION-CURABLE POLYURETHANES

(75) Inventors: Reinhold Schwalm, Wachenheim; Frank Völlinger, Edenkoben; Klaus Menzel, Ludwigshafen; Wolfgang Reich, Maxdorf; Erich Beck, Ladenburg; Thomas Jaworek, Kallstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 37 days.

(21) Appl. No.: 09/752,678

(22) Filed: Jan. 3, 2001

(30) Foreign Application Priority Data

Jan. 19, 2000 (DE) .......................... 100 02 089

(51) Int. Cl.$^7$ .......................... C09D 175/16; C08J 3/28; C08F 2/50; C08G 71/04
(52) U.S. Cl. .......................... 522/84; 522/85; 522/86; 522/90; 522/96; 522/75; 522/78; 524/839; 528/65
(58) Field of Search .............. 522/84, 85, 86, 522/75, 78, 90, 96; 524/839; 528/65

(56) References Cited

U.S. PATENT DOCUMENTS

| 4,339,566 A | 7/1982 | Rosenkranz et al. |
| 4,722,966 A | 2/1988 | Flakus |
| 4,730,021 A | * 3/1988 | Zom et al. .................. 524/457 |
| 5,135,963 A | 8/1992 | Haeberle et al. |
| 5,859,135 A | 1/1999 | Doomen et al. |
| 5,905,113 A | 5/1999 | Licht et al. |

FOREIGN PATENT DOCUMENTS

| DE | 34 37 918 | 4/1986 |
| EP | 26 313 | 4/1981 |
| EP | 181 486 | 5/1986 |
| EP | 209 684 | 1/1987 |
| EP | 392 352 | 10/1990 |
| EP | 554 784 | 8/1993 |
| EP | 0 560 508 | 9/1993 |
| EP | 0 603 046 | 6/1994 |
| EP | 704 469 | 4/1996 |
| EP | 801 092 | 10/1997 |
| JP | 4-085320 | 3/1992 |

* cited by examiner

Primary Examiner—Susan W. Berman
(74) Attorney, Agent, or Firm—Oblon, Spivak, McClelland, Maier & Neustadt, P.C.

(57) ABSTRACT

A water-dispersible, radiation-curable polyurethane composed essentially of
a) organic, aliphatic or alicyclic polyisocyanates,
b) cycloaliphatic diols and/or cycloaliphatic diamines,
c) compounds containing at least one isocyanate-reactive group and at least one free-radically polymerizable unsaturated group,
d) compounds containing at least one isocyanate-reactive group and at least one dispersing-active group,
e) if desired, compounds containing at least two isocyanate-reactive groups having a molecular weight <1000 g/mol,
f) if desired, compounds other than a) to d) containing at least one isocyanate-reactive group.

11 Claims, No Drawings

WEATHERING-STABLE, RADIATION-CURABLE POLYURETHANES

The invention relates to water-dispersible, radiation-curable polyurethanes possessing improved weathering stability. The invention likewise relates to dispersions comprising such polyurethanes. The invention further relates to a method of coating substrates using the polyurethane dispersions, to the use of the polyurethanes or their dispersions as coating compositions for exterior applications, and to substrates coated with the polyurethanes.

Water-dispersible, radiation-curable polyurethanes are known, for example, from U.S. Pat. No. 5,905,113, EP-A-801092 and EP-A-704469. They are generally obtainable by reacting a mixture of a chain extender, i.e., a component containing at least two OH groups or at least two $NH_2$ groups, at least one compound containing dispersing-active groups, i.e., ionic or ionizable groups, and containing an isocyanate-reactive group, and at least one hydroxyalkyl ester of an ethylenically unsaturated carboxylic acid, especially hydroxyethyl acrylate, with a compound containing at least two isocyanate groups. Bifunctional compounds containing two OH groups that are frequently used are hydroxyl-bearing polyesters or hydroxyl-bearing polyethers. When using hydroxyl-bearing polyethers, however, unsatisfactory weathering stabilities are obtained. Polyurethanes containing polyester structures are unstable to hydrolysis and therefore unsuited to producing weather-stable coatings. Moreover, the surface tack of the coatings obtained is high. The use of polycaprolactones leads to improved weathering stability.

Aqueous polyurethane dispersions are used predominantly to coat wood, leather and paper in the interior sector. The use of radiation-curable coatings in the exterior sector is still problematic, since aqueous dispersions in particular do not have the desired weathering and chemical stability.

U.S. Pat. No. 5,859,135 discloses aqueous dispersions of polymers containing functional crosslinkable groups and possessing lipophilic main chains, based in particular on polyesters. Owing to the high molecular weight of the disclosed lipophilic main chains, however, the crosslinking densities achieved are inadequate for good scratch resistance and chemical stability.

EP-A-26313 and EP-A-554 784 disclose aqueous polyurethane dispersions and their use as coating compositions. The presence of sulfonic acid groups and/or sulfonate groups gives these polyurethanes a high hydrophilicity, leading to inadequate wet strength of coatings produced from them.

Polyurethanes containing carboxylic acid groups as dispersing-active component have also to date been unsatisfactory in their performance properties. For instance, polyurethane dispersions in accordance with EP-A-392 352, EP-A-181 486 and EP-A-209 684 exhibit disadvantages in terms of chemical resistance and mechanical properties, such as hardness, elasticity and flexibility of coatings for example.

Water-dispersible, radiation-curable polyurethanes are also known from EP-A-704469. The polyurethanes are composed of organic polyisocyanates, polyesterpolyols, compounds containing at least one isocyanate-reactive group and at least one carboxyl or carboxylate group, compounds containing at least one isocyanate-reactive group and at least one copolymerizable unsaturated group, and further components if desired. These polyurethanes represent an improvement in terms of wet strength, chemical resistance and mechanical properties of the coatings produced with them.

There continues to be a need for further improvement, especially as regards weathering stability, chemical stability, scratch resistance, flexibility and other mechanical properties.

It is an object of the present invention to provide weathering-stable, radiation-curable, polyurethanes which give coatings possessing good weathering stability and good chemical resistance and are therefore suitable for exterior applications. Moreover, it is intended that the coatings should have high scratch resistance and good mechanical properties.

A further object of the present invention is to provide polyurethane dispersions comprising such polyurethanes and a process for preparing these polyurethane dispersions.

We have found that these objects are achieved by means of a water-dispersible, radiation-curable polyurethane composed essentially of:
a) organic, aliphatic or alicyclic polyisocyanates,
b) cycloaliphatic diols and/or cycloaliphatic diamines,
c) compounds containing at least one isocyanate-reactive group and at least one free-radically polymerizable unsaturated group,
d) compounds containing at least one isocyanate-reactive group and at least one dispersing-active group.

Preferably, the water-dispersible, radiation-curable polyurethane further comprises one or more of the following constituents:
e) compounds containing at least two isocyanate-reactive groups having a molecular weight <1000 g/mol, preferably <500 g/mol,
f) compounds other than b) to d) containing at least one isocyanate-reactive group.

The dispersions of the polyurethanes, optionally, comprise
g) from 0 to 10% by weight of one or more photochemically and/or thermally activatable initiators,
h) from 0 to 10% by weight of UV absorbers and light stabilizer compounds based on sterically hindered amines.

The polyurethanes, and their aqueous dispersions, are suitable as coating compositions for exterior applications. The coatings obtained exhibit high weathering stability and chemical resistance and no surface tack.

Component a)

Suitable polyisocyanates a) are preferably those having an NCO functionality of at least 2, in particular at least 3.

Suitable examples include linear or branched $C_4$–$C_{14}$ alkylene diisocyanates, cycloaliphatic diisocyanates having in all 6 to 12 carbon atoms, polyisocyanates containing isocyanurate groups, uretdione diisocyanates, polyisocyanates containing biuret groups, polyisocyanates containing urethane and/or allophanate groups, polyisocyanates containing oxadiazinetrione groups, uretonimine-modified polyisocyanates, or mixtures thereof.

Examples of suitable diisocyanates that may be mentioned include tetramethylene diisocyanate, hexamethylene diisocyanate(1,6-diisocyanatohexane; HDI), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates such as 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane (isophorone diisocyanate; IPDI) or 2,4- or 2,6-diisocyanato-1-methylcyclohexane.

The polyisocyanates containing isocyanurate groups comprise, in particular, simple trisisocyanato isocyanurates, which constitute cyclic trimers of the diisocyanates, or mixtures with their higher homologues containing more than one isocyanurate ring. The isocyanato isocyanurates generally have an NCO content of from 10 to 30% by weight, in particular from 15 to 25% by weight, and an average NCO functionality of from 3 to 4.5.

The uretdione diisocyanates are cyclic dimerization products of diisocyanates. The uretdione diisocyanates may be used, for example, as sole component or in a mixture of other polyisocyanates, especially the isocyanates containing isocyanurate groups.

Suitable polyisocyanates containing biuret groups preferably have an NCO content of from 18 to 22% by weight and an average NCO functionality of 3 to 4.5.

Polyisocyanates containing urethane and/or allophanate groups may be obtained, for example, by reacting excess amounts of diisocyanates with simple polyhydric alcohols such as trimethylolpropane, glycerol, 1,2-dihydroxypropane or mixtures thereof. These polyisocyanates containing urethane and/or allophanate groups generally have an NCO content of from 12 to 20% by weight and an average NCO functionality of from 2.5 to 3.

Polyisocyanates containing oxadiazinetrione groups may be prepared from diisocyanate and carbon dioxide.

Said polyisocyanates may also be used with preference in a mixture.

Preferred polyisocyanates are diisocyanates and (cyclo) aliphatic polyisocyanates of higher functionality.

Particular preference is given to polyisocyanates containing isocyanurate, allophanate and biuret groups, especially those of hexamethylene diiosocyanate, isophorone diisocyanate, or 1,3- or 1,4-bis(isocyanatomethyl) cyclohexane.

Particular preference is also given to mixtures of diisocyanates, e.g., hexamethylene diisocyanate and isophorone diisocyanate, with higher-functional polyisocyanates in a weight ratio of from 95:5 to 5:95, in particular from 95:50 to 5:50.

The isocyanate groups may also be present in capped form. Examples of suitable capping agents for NCO groups are oximes, phenols, imidazoles, pyrazoles, pyrazolinones, diketopiperazines, caprolactam, malonic esters or compounds as stated in the publications by Z. W. Wicks, Prog. Org. Coat. 3 (1975) 73-99 and Prog. Org. Coat. 9 (1981), 3-28, and in Houben-Weyl, Methoden der Organischen Chemie, vol. XIV/2, 61 ff. Georg-Thieme-Verlag, Stuttgart, Germany 1963.

Component b)

Used in accordance with the invention instead of the prior art polyethers and polyesters are comparatively short-chain diols containing cycloaliphatic structural elements. Cycloaliphatic diamines may also be used.

The cycloaliphatic diols and diamines comprise, in particular, compounds of the formula I:

H—X—R$^1$—X—H where
R$^1$ is C$_1$–C$_{12}$ alkylene interrupted by 1, 2 or 3 C$_3$–C$_8$ cycloalkyl 35 groups; C$_3$–C$_8$ cycloalkylene; or bicyclic C$_6$-C$_{10}$ cycloalkylene, it being possible for the cycloalkyl groups and the bicyclic cycloalkyl groups to be substituted by 1, 2 or 3 C$_1$-C$_4$ alkyl groups;
X is O or NR$^2$;
R$^2$ is H or C$_1$–C$_4$ alkyl,
and if X=NR$^2$, R$^1$ may also be —(CH$_2$)$_m$— and the two radicals R$^2$ may together be —(CH$_2$)$_m$—, m and n independently of one another being 1, 2 or 3.

The alkylene chain may be linear or branched. It is preferably a C$_2$–C$_6$ alkylene chain. The cycloalkyl group(s) may be arranged at any point in the alkylene chain. Preferably, two cycloalkyl groups are arranged terminally on the alkylene chain or one cycloalkyl group is arranged internally in the alkylene chain.

The cycloalkyl group is preferably a cyclopentyl or cyclohexyl group.

The bicyclic cycloalkyl group is preferably a norbornane, pinane or decalin group.

Other suitable cycloaliphatic diols are esters of the formula II:

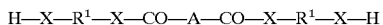
H—X—R$^1$—X—CO—A—CO—X—R$^1$—X—H where R$^1$ is as defined above, X is O and A is C$_2$-C$_6$ alkylene, cyclopentylene, cyclohexylene, phenylene or O—CO—O.

In preferred diols, OH groups are attached to the cyclic moieties of the molecule.

Particularly preferred diols are diols of the formula III:

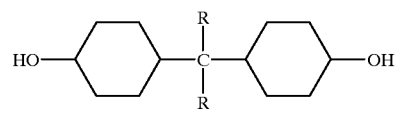

(where R independently of each other represents H, CH$_3$ or C$_2$H$_5$) and 1,4-bishydroxymethylcyclohexane, 1,3-bis(4-hydroxycyclohexyl)propane, 2,2,4,4-tetramethylcyclobutane-1,3-diol, 1,3- and 1,4-cyclohexanediol, cyclooctanediol, norbornanediol, pinanediol, decalindiol and their carbonates and esters of the formula II. As dicarboxylic acids it is preferred to use adipic acid and 1,4-cyclohexanedicarboxylic acid.

The preparation of these esters and carbonates takes place in a customary manner and is known to the skilled worker.

Preferred diamines are methylene- or isopropylidene-bis (cyclohexylamine), piperazine, 1,4-diaminocyclohexane or 1,4-bisaminomethylcyclohexane.

Particularly preferred components b) are 1,4-bishydroxymethylcyclohexane and 1,3-bis(4-hydroxycyclohexyl)propane.

Particularly preferred diols b), moreover, are perhydrogenated bisphenol A and other compounds comprising two cyclohexanol units connected by an alkylene bridge.

Component c)

Examples of suitable components c) are esters of monoethylenically unsaturated C$_3$–C$_6$ monocarboxylic acids, preferably esters of acrylic or methacrylic acid with polyols, in which at least one hydroxyl group remains unesterified. Preference is given to C$_2$–C$_{12}$ hydroxyalkyl (meth)acrylates, especially C$_2$–C$_6$ hydroxyalkyl (meth)acrylates, in which the alkyl chains may be linear or branched.

Moreover, suitable components c) are vinyl ethers, allyl ethers and methallyl ethers of polyols, preferably of aliphatic polyols having 2 to 10 carbon atoms or of cycloaliphatic diols having a free hydroxyl group.

Particularly preferred components c) are hydroxyalkyl acrylates, such as hydroxyethyl, hydroxypropyl and hydroxybutyl acrylate, pentaerythritol triacrylate, trimethylolpropane diacrylate and hydroxyethyl vinyleethers, such as hydroxybutyl vinyl ether, cyclohexanedimethanol monovinyl ether.

Component d)

Compounds used as component d) contain at least one, preferably one or two isocyanate-reactive groups, such as hydroxyl groups, primary or secondary amino groups or mercapto groups, and at least one dispersing-active group.

Dispersing-active groups are preferably carboxyl groups and/or sulfonic acid groups or the salt forms of these.

As component d), suitable compounds are therefore carboxylic acids or sulfonic acids containing at least one hydroxyl, amino or mercapto group. Preference is given to aliphatic mono- or dihydroxy-, monomercapto- or monoamino-carboxylic acids or sulfonic acids, such as mercaptoacetic acid (thioglycolic acid), mercaptopropionic acid, thiolactic acid, mercaptosuccinic acid, glycine, iminodiacetic acid, sarcosine, alanine, leucine, isoleucine, aminobutyric acid, hydroxyacetic acid, hydroxypivalic acid, lactic acid, hydroxydecanoic acid, hydroxydodecanoic acid, hydroxyhexadecanoic acid, hydroxyethane sulfonic acid, hydroxypropane sulfonic acid, mercaptoethane sulfonic acid, mercaptopropane sulfonic acid, aminomethane sulfonic acid, taurine, aminopropane sulfonic acid, bis(hydroxyalkyl)carboxylic acids, such as dimethylolpropionic acid, preferably thioglycolic acid, hydroxyacetic acid, dimethylolpropionic acid and hydroxypivalic acid.

By virtue of component d) the polyurethanes are dispersible; i.e., for dispersion in water no dispersing auxiliaries, such as protective colloids or emulsifiers, are necessary. Prior to or during dispersion in water, the carboxyl groups and/or sulfonic acid groups may be neutralized using organic and/or inorganic bases, such as alkali metal hydroxides, carbonates and hydrogen carbonates, ammonia, or primary, secondary or—preferably—tertiary amines, such as triethylamine.

Component e)

Optimal compounds used as component e) are hydrolytically stable short-chain diols, especially $C_2$-$C_{12}$ diols, such as ethylene glycol, butanediol, hexanediol and decanediol. Also suitable are diols and/or diamines having short-chain ether, ester, carbonate or urethane segments composed of the diols specified for components b) or e).

Component f)

If desired, it is possible for the composition of the polyurethanes of the invention to use a further component different than components b) to e). This component comprises, in particular, mono-$C_1$-$C_{12}$ alcohols, mono-$C_1$-$C_{12}$ mercaptans or mono-$C_1$-$C_{12}$ amines, such as methanol, ethanol, cyclohexanol, cyclohexylamine, etc.

Component g)

Suitable as component g) are from 0 to 10% by weight, preferably from 0.1 to 5% by weight, based on the weight of the radiation-curable polyurethane, of one or more photochemically or free-radically activatable initiators, especially photoinitiators which exhibit little or no yellowing. These include the phenylglyoxylic esters of the formula:

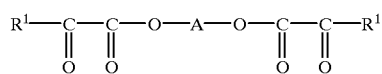

I where the two radicals $R^1$ independently of one another are a radical of the formula

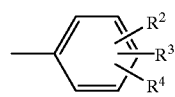

$R^2$, $R^3$ and $R^4$ independently of one another are H, $C_1$-$C_6$ alkyl unsubstituted or substituted by OH, $OC_1$-$C_6$ alkyl or $OCOC_1$-$C_6$ alkyl, or are OH or $OC_1$-$C_6$ alkyl;

A is $C_2$-$C_6$ alkylene or a radical of the formulae

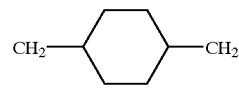

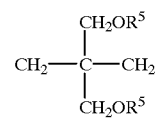

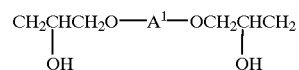

the radicals $R^5$ independently of one another are H or $COCOR^1$, and $A^1$ is $C_2$-$C_6$ alkylene or

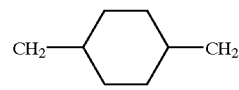

The phenylglyoxylic esters are described in DE 19913353 and may be prepared by the process described in WO 98/33761.

Photoinitiators which exhibit little or no yellowing are also the phenylglyoxylic acids of the formula

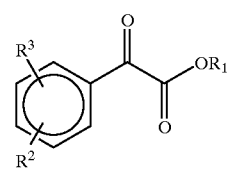

where
$R^1$ is a hydrogen atom or a $C_1$-$C_{18}$ alkyl group, and
$R^2$ and $R^3$ independently of one another are a hydrogen atom or a $C_1$-$C_{18}$ alkoxy group.

These compounds are described in DE 19826712 and in Angew. Makromol. Chem. 1981, 93 (1), 83–95. Further suitable photoinitiators are, for example, benzophenone, alkylbenzophenones, halomethylated benzophenones, Michler's ketone, anthron and halogenated benzophenones. Also suitable are benzoin and its derivatives. Likewise effective photoinitiators are anthraquinone and many of its derivatives, such as β-methylanthraquinone, tert-butylanthraquinone and anthraquinonecarboxylic esters, for example, and acylphosphine oxides, e.g., 2,4,6-trimethylbenzoyldiphenylphosphine oxide (Lucirin® TPO).

The photoinitiators, which depending on the intended use of the compositions of the invention are used generally in amounts of from 0.05 to 20% by weight, preferably from 0.05 to 5% by weight, based on the polyurethane, may be used as the individual substance or, owing to frequent advantageous synergistic effects, in combination with one another.

Advantageous additives which may lead to a further increase in the reactivity are tertiary amines such as triethylamine and triethanolamine, for example. They are also used generally in amounts of up to 5% by weight, based on the polyurethane.

Component h)

Compounds suitable as component h) are UV absorbers and HALS (Hindered Amine Light Stabilizer) compounds, as described for example in U.S. Pat. No. 5,369,140. These are UV absorbers from the class of the 2-hydroxyphenyl-s-triazines and light stabilizers from the class of the sterically hindered amines, especially those from the class of the 2,2,6,6-tetramethylpiperidines.

The fractions of the structural components are preferably as follows:
b) 0.05 to 0.4 equivalent, with particular preference from 0.1 to 0.3 equivalent of hydroxyl groups, based on one equivalent of polyisocyanate a) (from 5 to 40 mol %);
c) Component c) is used in an amount such that the double bond content of the polyurethanes is from 0.15 to 0.6, preferably from 0.2 to 0.5 mol/100 g of polyurethane.
d) Component d) is used in an amount such that the polyurethane 20 has a dispersing-active group content of from 0.005 to 0.1, with particular preference from 0.01 to 0.03 mol per 100 g of polyurethane.
e) From 0 to 0.2 equivalent, with particular preference from 0 to 0.1 equivalent, based on one equivalent of polyisocyanate a);
f) from 0 to 0.4, with particular preference from 0.1 to 0.3, equivalent of isocyanate-reactive groups.

The molar ratio of isocyanate groups to the isocyanate-reactive groups of all structural components b) to f) is preferably from 1:0.8 to 1:1.2, with particular preference approximately 1:1.

The polyurethanes of the invention are prepared by reacting components a), b) and c) and, if desired, e) in a solvent-containing precursor prior to dispersion and, if desired, adding component h) (light stabilizers based on sterically hindered amines) to the solvent-containing precursor. The course of the reaction may be monitored by the consumption of the functional groups, especially the isocyanate groups.

The reaction is preferably conducted in an inert, water-miscible solvent, such as acetone, tetrahydrofuran, methyl ethyl ketone or N-methylpyrrolidone. The reaction temperature is generally from 20 to 100° C., preferably from 50 to 80° C.

The reaction of the isocyanates may be accelerated using the customary catalysts, such as dibutyltin dilaurate, tin(II) octoate or diazabicyclo[2.2]octane.

Component d) and, if desired, component f) is preferably not added until toward the end of the reaction. Then, an amine, an example being triethylamine, or a mixture of amines is used for neutralization. The solvent may then be removed by distillation and the water required for dispersing the polyurethane is added. Usually afterwards, component g) and, if desired, h) are added. These components, however, may also be added at an earlier point.

The solids content of the resulting dispersion is preferably from 25 to 60%, with particular preference from 30 to 50%.

The average particle size (determined using a Zetasizer, from Malvern Instruments) is below 10 $\mu$m, preferably below 3 $\mu$mm and with very particular preference below 1 $\mu$m. The lower average particle size limit is generally about 30 nm.

The dispersions of the invention may include further additives, examples being pigments, dyes, fillers and customary coatings auxiliaries.

The dispersions of the invention may also be crosslinked thermally if they contain initiators which form free radicals at elevated temperatures. Use may be made, for example, of dibenzoyl peroxide, cumene hydroperoxide or azodiisobutyronitrile.

The polyurethanes and polyurethane dispersions of the invention may be used to produce moldings and, preferably, coatings.

The dispersions of the invention are found particularly suitable for coating substrates such as wood, paper, textile, leather, nonwoven, plastics surfaces, glass, ceramic, mineral building materials, such as shaped cement products and fiber cement slabs, and metals or coated metals.

The present invention accordingly also provides a method of coating substrates, and the coated substrates obtainable by this method. The substrates are generally coated by applying at least one dispersion of the invention, to which typical coatings additives may have been added, to the target substrate in the desired thickness and removing any solvent present. If desired, this operation may be repeated one or more times. The radiation-curable formulations are applied to the substrate in a known manner, for example, by spraying, troweling, knife coating, brushing, rolling, roller coating, or flow coating. The coating thickness is generally in the range from 3 to 1000 g/m$^2$ and preferably from 10 to 200 g/m$^2$. Application may be made either at room temperature or at elevated temperature, but preferably not above 100° C.

In the case of porous substrates, such as leather, paper or wood, for example, the times required for physical drying are generally very short, since the majority of the water is absorbed by the substrate.

In general, the coatings are subsequently cured by exposure to high-energy radiation.

If desired, if two or more coats of the coating composition are applied atop one another, radiation curing may be carried out after each coating operation.

Radiation curing takes place by exposure to high-energy radiation, i.e., UV radiation or daylight, preferably light with a wavelength of from 250 to 600 nm, or by bombardment with high-energy electrons (electron beams; from 150 to 300 keV). Examples of radiation sources used are high-pressure mercury vapor lamps, lasers, pulsed lamps (flashlight), halogen lamps, and excimer emitters. The radiation dose commonly sufficient for crosslinking in the case of UV curing is in the range from 80 to 3000 mJ/cm$^2$.

Irradiation may also be conducted, if desired, in the absence of oxygen, under an inert gas atmosphere, for example. Suitable inert gases are, preferably, nitrogen, noble gases, carbon dioxide, or combustion gases. Furthermore, irradiation may be carried out by covering the coating composition with transparent media. Examples of transparent media are polymer films, glass or liquids, e.g., water.

In one preferred process, curing takes place continuously by passing the substrate treated with the formulation of the invention past a radiation source at a constant speed. This requires the curing rate of the formulation of the invention to be sufficiently high.

Even after physical drying only, the polymethanes of the invention give an essentially tack-free, dry coating. After radiation curing, the coating possesses very good weathering stability, chemical stability and scratch resistance with at least comparable mechanical properties such as hardness, tensile strength, elasticity, flexibility, and adhesion.

The invention is illustrated below with reference to examples.

EXAMPLE 1

Preparation of a Weathering-Stable Polyurethane Acrylate Dispersion

Preparation of the Precursor:

A stirred vessel was charged with 455 parts of hydroxyethyl acrylate, 377 parts of 2,2-bis(4-hydroxycyclohexyl)

propane, 2.3 parts of 2,6 di-t-butyl-p-cresol, and 1.2 parts of hydroquinone monomethyl ether, 0.5 part of dibutyltin dilaurate and 1500 parts of the isocyanurate of hexamethylene diisocyanate are added, and the mixture was stirred at 60° C. for 5 hours. The batch was diluted with 500 parts of acetone. The NCO value was 1.05%.

Preparation of Polyurethane Dispersion:

882 parts of this solution were admixed with 9.7 parts of thioglycolic acid and 3.7 parts of methanol and the mixture was left to react at 40° C. for 8 hours, after which 11 parts of triethylamine were added. The batch was dispersed in water and the acetone was removed by distillation. The particle size was 75 nm.

COMPARATIVE EXAMPLE 1

(Example 1 of EP 704469):

A stirred vessel was charged with 6.74 g of a polyester prepared from isophthalic acid, 1,6-hexanediol and adipic acid, having a molecular weight of approximately 2000 (number average) and approximately 10,000 (weight average), 3.26 kg of 1,4-butanediol, 7.83 kg of 2-hydroxyethyl acrylate, 1.6 kg of acetone, 31.2 g of hydroquinone monomethyl ether, 19.4 g of dibutyltin dilaurate and 58.2 g of 2,6-di-t-butyl-p-cresol. The contents were heated initially to 60° C. and a mixture of 15.91 kg of isophorone diisocyanate with 4.94 kg of Basonat PLR 8 638 (trimerized HDI) was added dropwise over the course of two hours. After the isocyanate content had fallen to 1.15%, 3.16 kg of PUD salt (Michael adduct of acrylic acid with ethylenediamine) were added in the form of a 40% strength aqueous solution. Finally, 47.7 kg of distilled water were added, the vessel interior was heated to 65° C., and an acetone/water mixture was removed by distillation. The water lost by distillation was replaced by adding more. The particle size was 65 nm.

Performance Testing

Production of Films

The dispersions from Example 1 and comparative Example 1 were admixed with 4% by weight of photoinitiator Irgacure 500 (Ciba) (benzil dimethyl ketal), applied to various substrates in film thicknesses of approximately 40 μm, and treated as follows: ventilation at room temperature overnight, then heat treatment at 60° C. for 15 minutes and exposure in an IST UV unit on a conveyor belt at 10 m/min with 2 UV lamps (120 W/cm). Both films were physically dry and through-cured (fingernail test).

The chemical stability was determined in accordance with DIN 68861 (chemical resistance of furniture surfaces) for 10 chemicals (cleaning agent, ballpoint pen paste, disinfectant, lipstick, mustard, butyl acetate, blackcurrant juice, coffee, red wine, sodium carbonate; substrate: black-colored basecoat on metal) (rating 0: no visible change to rating 5: test area destroyed).

The scratch resistance was determined in an abrasion test in which 50 double strokes were performed using a Scotch Brite fabric under a weight of 750 g. The level of scratching of the coating on a black-colored glass plate was determined by measuring the drop in gloss in % (before and after corresponding exposure).

The weathering stability was determined by applying films of the dispersions approximately 35 μm thick to a barium fluoride crystal and curing them. These samples were then exposed to UV-water cycles of 8 hours' irradiation at 70° C. and 4 hours' dark condensation at 50° C. in a QUV Weather-o-meter UVA-A-340 with fluorescent lamps. After 300 hours, the decrease in the C—H (2951 cm$^{-1}$) and C—N (1531 cm$^{-1}$) bands in the IR spectrum was measured. Alternatively, samples of coating material were irradiated in the Xenon test 1200 from Heraeus in accordance with ISO/DIS 11341 (dry period 17 min/irrigation period 3 min) and the drop in degree of gloss was measured.

The pendulum hardness was determined in accordance with DIN 53157 (substrate: black-colored glass plate). It is a measure of the hardness of the coating (high values: high hardness).

The Erichsen indentation was determined in accordance with DIN ISO 1520 (substrate: Bonder panel). It is a measure of the flexibility and adhesion of the coating (high values: high flexibility).

|  | Chemical stability (rating) | Scratch resistance (Loss of gloss, %) | Weathering stability (reduction in C-H, C-N bands, %) |
|---|---|---|---|
| Example 1 | 0.70 | 29 | 4/0 |
| Comparative Example 1 | 1.05 | 61 | 7/15 |

With an equal level in terms of mechanical properties (pendulum hardness Example 1: 114 swings/comparative Example 1: 105 swings; Erichsen indentation Example 1: 7.8 mm/comparative Example 1: 8.6 mm) and initial physical drying (pendulum hardness before UV irradiation Example 1:8 swings/comparative Example 1:12 swings), there are clearly improvements in the chemical, scratch and weathering stability.

COMPARATIVE EXAMPLES 2 TO 6

In Example 1, the bis(hydroxycyclohexyl)propane fraction was replaced by other diols, short-chain polyethers, polyesters, polycarbonate and polymethacrylate diols:

C2: polyether of tetrahydrofuran (poly-THF 1000)
C3: polycarbonate Desmodur 2020 (Bayer AG)
C4: aromatic polyester prepared from isophthalic acid, adipic acid and hexanediol (M=1000)
C5: Polymethacrylate: BD 1000 from Goldschmidt
C6: aliphatic polyester prepared from adipic acid and neopentyl glycol (M=3024).

|  | Weathering stability | |
|---|---|---|
|  | Decrease in C-H band (in %) | Decrease in C-N band (in %) |
| C2 | 24 | 18 |
| C3 | 10 | 19 |
| C4 | 11 | 22 |
| C5 | 6 | 18 |
| C6 | 11 | 23 |
| Example 1 | 4 | 0 |

EXAMPLE 2

The procedure of Example 1 was repeated but using a mixture of 75% of the isocyanurate of HDI with 25% of the isocyanurate of IPDI, instead of the isocyanurate of HDI.

The initial physical drying is markedly improved: Pendulum hardness before UV: 21 swings. In the Xenon test, there is no drop in gloss after 300 hours.

EXAMPLE 3

Preparation of a Weathering-Stable Polyurethane Acrylate Dispersion Based on Allophanate.

A stirred vessel was charged with 43 parts of acetone, 92 parts of 2,2-bis(4-hydroxycyclohexyl)propane, 0.4 part of 2,6-di-t-butyl-p-cresol and 0.2 part of hydroquinone monomethyl ether, 0.1 part of dibutyltin dilaurate and 333 parts of an allophanate of hydroxylethyl acrylate and hexamethylene diisocyanate were added, and the mixture was stirred at 65° C. for 5 hours. The batch was diluted with 50 parts of acetone. The NCO value was 0.68%. 8.5 parts of thioglycolic acid are added and the mixture was left to react at 60° C. for 6 hours, after which 94 parts of triethylamine were added. The batch, then, was dispersed in water and the acetone was removed by distillation (28% solids content). There was no drop in gloss in the Xenon test after 300 hours.

We claim:

1. A water-dispersible, radiation-curable polyurethane composed essentially of
   a) organic, aliphatic or alicyclic polyisocyanates,
   b) cycloaliphatic diols and/or cycloaliphatic diamines,
   c) compounds containing at least one isocyanate-reactive group and at least one free-radically polymerizable unsaturated group,
   d) compounds containing at least one isocyanate-reactive group and at least one dispersing-active group,
   e) if desired, compounds containing at least two isocyanate-reactive groups having a molecular weight <1000 g/mol,
   f) if desired, compounds other than b) to d) containing at least one isocyanate-reactive group.

2. A polyurethane as claimed in claim 1, wherein the polyisocyanate a) is an isocyanurate, a biuret or an allophanate of hexamethylene diisocyanate or isophorone diisocyanate or is a mixture of the compounds.

3. A polyurethane as claimed in claim 1, wherein the diol b) is 1,4-bishydroxymethylcyclohexane, bis(hydroxycyclohexyl)propane or cyclohexanediol or a mixture of at least two of the diols.

4. A polyurethane as claimed in claim 1, wherein the fraction of the diol b) is from 5 to 40 mol %, based on the isocyanate groups.

5. A polyurethane as claimed in claim 1, comprising as component c) at least one selected from the group consisting of hydroxyethyl acrylate, hydroxypropyl acrylate, hydroxybutyl acrylate and pentaerythritol triacrylate.

6. A polyurethane as claimed in claim 1, wherein dimethylolpropionic acid, thioglycolic acid, hydroxyacetic acid, hydroxypivalic acid or a mixture of at least two of the acids is present as component d).

7. A polyurethane dispersion comprising a water-dispersible, radiation-curable polyurethane composed essentially of
   a) organic, aliphatic or alicyclic polyisocyanates,
   b) cycloaliphatic diols and/or cycloaliphatic diamines,
   c) compounds containing at least one isocyanate-reactive group and at least one free-radically polymerizable unsaturated group,
   d) compounds containing at least one isocyanate-reactive group and at least one dispersing-active group,
   e) if desired, compounds containing at least two isocyanate-reactive groups having a molecular weight <1000 g/mol,
   f) if desired, compounds other than b) to d) containing at least one isocyanate-reactive group,
   and if desired
   g) from 0 to 10% by weight of one or more photochemically and/or thermally activatable initiators,
   h) from 0 to 10% by weight of UV absorbers and Hindered Amine Light Stabilizer compounds.

8. A method of coating substrates, which comprises applying a polyurethane dispersion as claimed in claim 7, to which typical coatings additives have been added if desired, to a substrate, drying it and curing it with electron beams or UV light under oxygen or, preferably, under inert gas.

9. A coating composition for exterior application comprising the polyurethane as claimed in claim 1.

10. A substrate coated with a radiation-curable polyurethane as claimed in claim 1.

11. A coating composition for exterior application comprising the polyurethane dispersion of claim 7.

* * * * *